US012807412B2

(12) United States Patent
Kang et al.

(10) Patent No.: US 12,807,412 B2
(45) Date of Patent: Nov. 24, 2026

(54) APPARATUS AND METHOD FOR STORING ARTICLES

(71) Applicant: Samsung Electronics Co., Ltd., Suwon-si (KR)

(72) Inventors: Seung Gyu Kang, Suwon-si (KR); Yong-Jun Ahn, Suwon-si (KR); Kyu Sang Ko, Suwon-si (KR); Jae Sung Byun, Suwon-si (KR); Min Kyun Lee, Suwon-si (KR); Sang Kyung Lee, Suwon-si (KR); Jeong Hun Lim, Suwon-si (KR); Jun Hyuk Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 248 days.

(21) Appl. No.: 18/794,351

(22) Filed: Aug. 5, 2024

(65) Prior Publication Data

US 2025/0206533 A1 Jun. 26, 2025

(30) Foreign Application Priority Data

Dec. 21, 2023 (KR) ........................ 10-2023-0188991
Feb. 20, 2024 (KR) ........................ 10-2024-0024119

(51) Int. Cl.
*B65G 1/137* (2006.01)
*B65G 1/04* (2006.01)
*G06Q 10/08* (2023.01)

(52) U.S. Cl.
CPC ......... *B65G 1/1371* (2013.01); *B65G 1/0485* (2013.01); *G06Q 10/08* (2013.01); *B65G 1/0492* (2013.01); *B65G 2203/0216* (2013.01)

(58) Field of Classification Search
CPC .. B65G 1/1371; B65G 1/0485; B65G 1/0492; B65G 2203/0216; G06Q 10/08
See application file for complete search history.

(56) References Cited

U.S. PATENT DOCUMENTS 8,881,297 B2 11/2014 Gonzalez et al.
9,866,321 B2 1/2018 Oh et al.
(Continued)

FOREIGN PATENT DOCUMENTS

KR 10-1616706 B1 5/2016
KR 10-2016-0121646 B1 6/2017

*Primary Examiner* — Kyle O Logan
(74) *Attorney, Agent, or Firm* — Muir Patent Law, PLLC

(57) ABSTRACT

An apparatus for storing articles includes first and second ports different from each other; and one input/output sensor corresponding to the first port and the second port, in which the input/output sensor includes a memory that stores first and second identifiers different from each other, and a controller that allocates the first identifier to the input/output sensor during a first time interval, and allocates the second identifier to the input/output sensor during a second time interval, the controller is configured such that, when the controller starts a communication with a conveying robot using the first identifier during the first time interval, the conveying robot performs an article loading and unloading operation at the first port, and when the controller starts the communication with the conveying robot using the second identifier during the second time interval, the conveying robot performs the operation at the second port.

20 Claims, 13 Drawing Sheets

(56) References Cited

U.S. PATENT DOCUMENTS

| | | | | |
|---|---|---|---|---|
| 9,880,963 | B2 | 1/2018 | Tanimoto et al. | |
| 10,190,287 | B2 * | 1/2019 | Koetz | E02F 9/26 |
| 2003/0187537 | A1 * | 10/2003 | Hocke | H10P 72/0618 700/121 |
| 2008/0306623 | A1 * | 12/2008 | Kang | G05B 19/41875 700/121 |
| 2012/0078411 | A1 * | 3/2012 | Shimamura | H10P 72/0612 700/214 |
| 2012/0296464 | A1 | 11/2012 | Im | |
| 2021/0215752 | A1 * | 7/2021 | Ito | G01R 31/2637 |
| 2023/0297083 | A1 | 9/2023 | Kim et al. | |

* cited by examiner

Fig. 7

| Port | ID | Channel | Port | ID | Channel |
|---|---|---|---|---|---|
| 1 | #100001 | 214 | 18 | #100018 | 214 |
| 2 | #100002 | 217 | 19 | #100019 | 217 |
| 3 | #100003 | 178 | 20 | #100020 | 178 |
| 4 | #100004 | 181 | 21 | #100021 | 181 |
| 5 | #100005 | 184 | 22 | #100022 | 184 |
| 6 | #100006 | 187 | 23 | #100023 | 187 |
| 7 | #100007 | 190 | 24 | #100024 | 190 |
| 8 | #100008 | 193 | 25 | #100025 | 193 |
| 9 | #100009 | 196 | 26 | #100026 | 196 |
| 10 | #100010 | 199 | 27 | #100027 | 199 |
| 11 | #100011 | 202 | 28 | #100028 | 202 |
| 12 | #100012 | 205 | 29 | #100029 | 205 |
| 13 | #100013 | 208 | | | |
| 14 | #100014 | 211 | | | |
| 15 | #100015 | 214 | | | |
| 16 | #100016 | 217 | | | |
| 17 | #100017 | 178 | | | |

APPARATUS AND METHOD FOR STORING ARTICLES

CROSS-REFERENCE TO RELATED APPLICATION

This application claims priority from Korean Patent Application No. 10-2023-0188991 filed on Dec. 21, 2023 and No. 10-2024-0024119 filed on Feb. 20, 2024 in the Korean Intellectual Property Office, and all the benefits accruing therefrom under 35 U.S.C. 119, the contents of which in there entireties are herein incorporated by reference

BACKGROUND

1. Technical Field

The present disclosure relates to an apparatus and method for storing articles.

2. Description of the Related Art

In a fabricating process of a semiconductor device, substrates may be transported through an unmanned transportation system. In particular, the unmanned transportation system may include transport vehicles (e.g., an overhead hoist transport (OHT), a rail guided vehicle (RGV), etc.) that are configured to be movable along traveling rails installed on a ceiling or a floor of a clean room. The operation of the transport vehicle may be controlled by an overhead controller such as an OCS (OHT Control Server) device.

SUMMARY

On the other hand, as a production volume of semiconductor devices increases, the capacity of the apparatus for storing articles (e.g., a stocker, a side track buffer) may become insufficient. In order to solve the capacity shortage, it is often necessary to increase the number of ports of the apparatus for storing articles and increase the storage integration within the same space. When the number of ports increases, the number of parallel input output (PIO) sensors of the apparatus for storing articles for communicating with a conveying robot needs to increase, and the equipment and electrical components associated with the PIO sensors also need to be added. Therefore, the footprint of the apparatus for storing articles increases and installation costs increase.

Some example embodiments of the present disclosure provide an apparatus for storing articles capable of reducing footprint and costs.

Some example embodiments of the present disclosure also provide a method for storing articles capable of reducing footprint and costs.

However, example embodiments of the present disclosure are not restricted to those set forth herein. The above and other aspects of the present disclosure will become more apparent to one of ordinary skill in the art to which the present disclosure pertains by referencing the detailed description of the present disclosure given below.

According to an example embodiment, an apparatus for storing articles according to some embodiments of the present disclosure includes first and second ports different from each other; and one input/output sensor corresponding to the first port and the second port, wherein the input/output sensor includes: a memory configured to store first and second identifiers different from each other, and a controller configured to allocate the first identifier to the input/output sensor during a first time interval, and allocate the second identifier to the input/output sensor during a second time interval, wherein the first port corresponds to the first identifier, and the second port corresponds to the second identifier, the controller is configured such that, when the controller starts a communication with a conveying robot using the first identifier during the first time interval, the conveying robot performs an article loading and unloading operation at the first port, and when the controller starts the communication with the conveying robot using the second identifier during the second time interval, the conveying robot performs the article loading and unloading operation at the second port.

According to an example embodiment, an apparatus for storing articles includes a plurality of ports; and one parallel input output (PIO) sensor that corresponds to the plurality of ports, wherein the PIO sensor includes: a memory configured to store a table including a plurality of PIO identifiers and a plurality of types of PIO channel information respectively corresponding to each of the plurality of PIO identifiers, and a controller connected to the memory, wherein the plurality of PIO identifiers have a one-to-one correspondence with the plurality of ports, the controller is configured to change the PIO identifier and the PIO channel information of the PIO sensor based on the table at each of a plurality of preset periods, when the changed PIO identifier and the changed PIO channel information match a PIO identifier and a PIO channel information of a conveying robot, the controller is configured to start communication with the conveying robot, and the conveying robot is configured to perform an article loading and unloading operation at a port corresponding to the matched PIO identifier.

According to an example embodiment, a method for storing articles includes providing an apparatus for storing articles which includes a plurality of ports, and one PIO sensor that corresponds to the plurality of ports, in which the PIO sensor includes a memory that stores a table including a plurality of PIO identifiers having a one-to-one correspondence with the plurality of ports, and a controller connected to the memory, changing a PIO identifier associated with the PIO sensor based on the table stored in the memory at each of a plurality of preset periods; starting a communication with a conveying robot, when the changed PIO identifier associated with the PIO sensor matches a PIO identifier of the conveying robot; and performing an article loading and unloading operation using the conveying robot at a port corresponding to the matched PIO identifier, the port being from among the plurality of ports.

Specific details of some example embodiments are included in the detailed description and drawings.

BRIEF DESCRIPTION OF THE DRAWINGS

The above and other aspects and features of the present disclosure will become more apparent by describing in detail some example embodiments thereof with reference to the attached drawings, in which:

FIG. 7 is a diagram for explaining a table stored in the memory of FIG. 6;

DETAILED DESCRIPTION OF THE EMBODIMENTS

Figure 1:
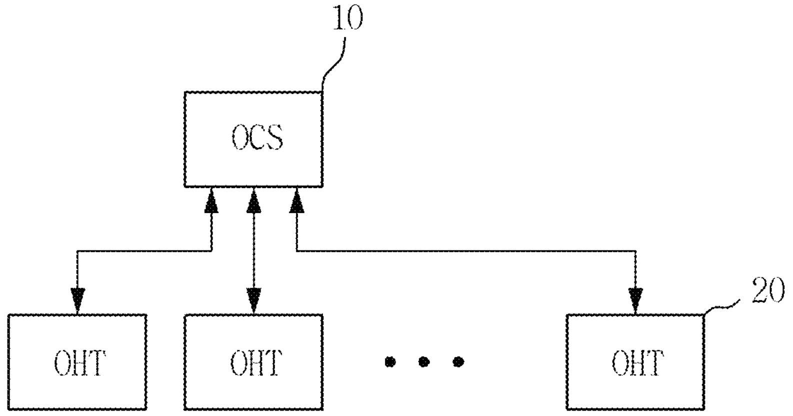
FIG. 1 is a conceptual diagram for explaining a conveying system according to some embodiments of the present disclosure.

Embodiments of the present disclosure will be described in detail below with reference to the accompanying drawings. The same reference numerals will be used for the same components in the drawings, and repeated description thereof will not be provided.

Figure 2:
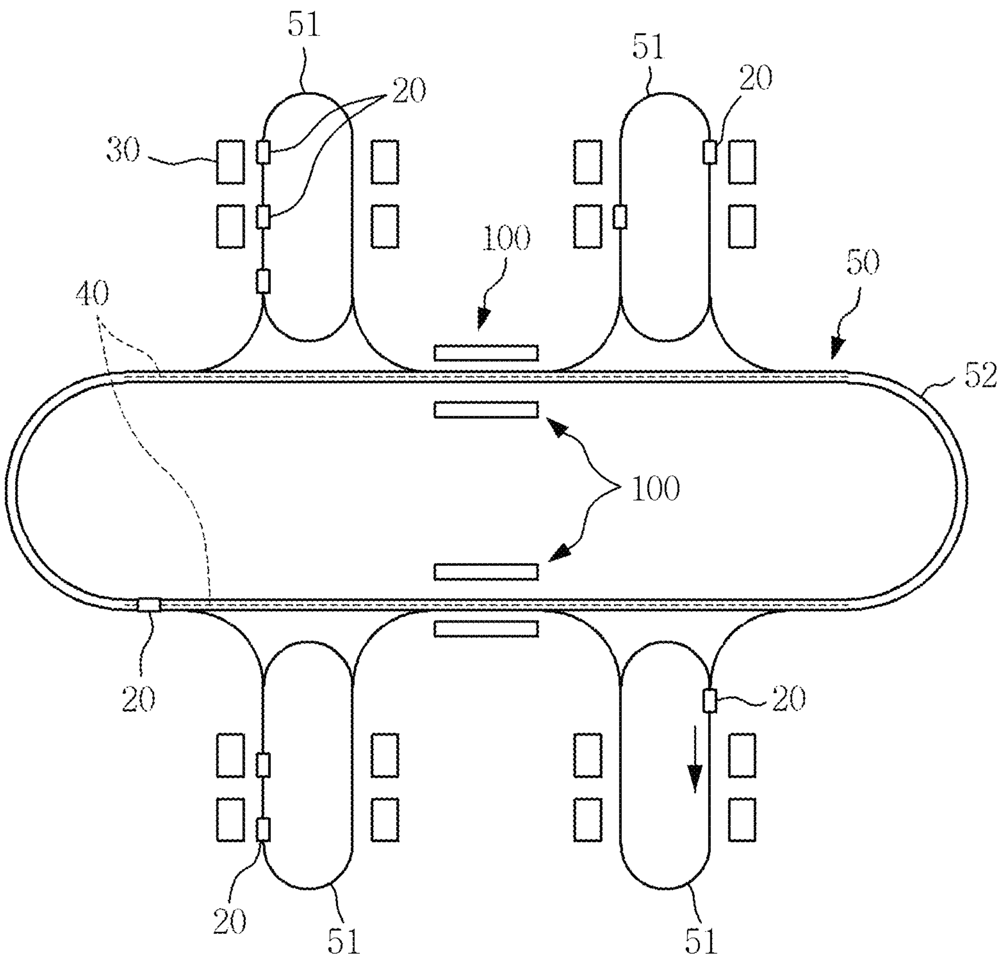
FIG. 2 is a conceptual plan view for explaining the conveying system according to some embodiments of the present disclosure.
Figure 3:
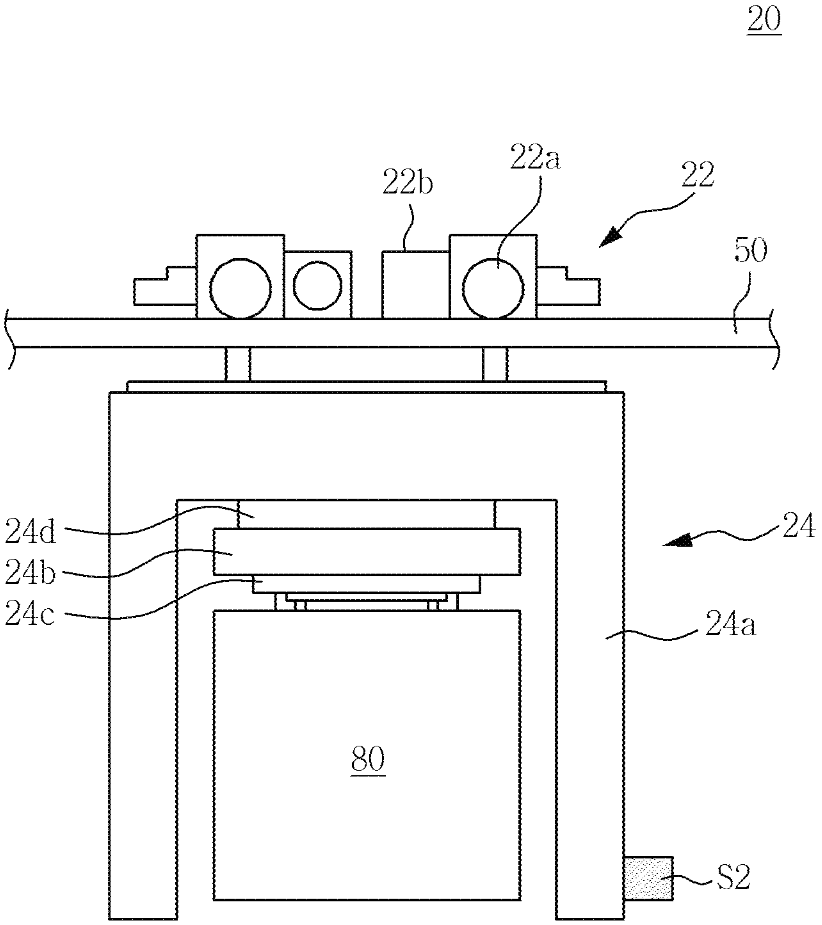
FIG. 3 is a diagram for explaining the conveying robot of FIG. 1.

FIG. 1 is a conceptual diagram for explaining a conveying system according to some embodiments of the present disclosure. FIG. 2 is a conceptual plan view for explaining the conveying system according to some embodiments of the present disclosure. FIG. 3 is a diagram for explaining the conveying robot of FIG. 1.

First, referring to FIG. 1, the transfer system according to some embodiments of the present disclosure includes an overhead controller (OCS, OHT control system) 10 and a plurality of conveying robots 20.

The conveying robot 20 may be, but is not limited to, an OHT (Overhead Hoist Transport) that travels along a rail installed on the ceiling of a semiconductor fabricating factory (namely, FAB). The conveying robot 20 may be, for example, but is not limited to, an OHS (Overhead Shuttle), an AGV (Automated Guided Vehicle), an RGV (Rail Guided Vehicle) or a PGV (Person Guided Vehicle).

The overhead controller 10 communicates with the plurality of conveying robots 20 through, for example, a wireless communication scheme, and controls the plurality of conveying robots 20.

The overhead controller 10 determines the destination of the conveying robot 20, calculates the cost between bases for reaching the destination, and determines a route to the destination on the basis of the calculated cost. The overhead controller 10 provides work instruction to each conveying robot 20 according to the determined route. The work instruction may include, for example, information such as a start position, an arrival position, and unloading of objects to be conveyed. The work instruction also includes an identifier (i.e., ID) of the input/output sensor (e.g., PIO sensor) provided at the start position or arrival position, and channel information for performing PIO communication (e.g., E84 communication) with the PIO sensor.

Here, referring to FIG. 2, in the conveying system according to some embodiments of the present disclosure, rails 50 may be installed at the ceiling, and may be configured as a combination of a straight line and a curved line. The rail 50 may include, but is not limited to, a main passage 52 and a plurality of bay parts 51 branching from the main passage 52.

As shown, the main passage 52 may have, but is not limited to, a closed curve structure. The plurality of bay parts 51 may be disposed on one side of the main passage 52, and the plurality of bay parts 51 may be disposed on the other side.

Furthermore, an article storing apparatus 100 for storing articles (e.g., a front opening unified pod (FOUP), a front opening shipping box (FOSB), etc.) may be disposed in the main passage 52. A plurality of semiconductor fabricating devices 30 may be disposed in the bay part 51.

While moving along the rails 50, the plurality of conveying robots 20 may, for example, convey the articles from the article storing apparatus 100 to the fabricating device 30, or convey the articles from the fabricating device 30 to the article storing apparatus 100. The articles may be conveyed from one article storing apparatus 100 to another article storing apparatus 100. Although FIG. 2 shows that the article storing apparatus 100 is provided in the main passage 52, the embodiment is not limited thereto. For example, the article storing apparatus 100 may be installed in the bay part 51 or may be installed in a passage (not shown) branching from the main passage 52.

On the other hand, the rail 50 includes a power feeding section in which the power line 40 is provided, and a non-power feeding section in which no power line 40 is provided. Although FIG. 2 shows, as an example, that the power line 40 is provided in a straight section of the main passage 52, and the power line 40 is not provided in a curved section of the main passage 52 and the bay part 51, the embodiment is not limited thereto.

Here, referring to FIG. 3, the conveying robot 20 includes a traveling module 22, a hoist module 24, an input/output sensor S2, and the like.

The traveling module 22 is installed on a housing 24*a*, and is installed to be movable along the rails 50. The traveling module 22 includes a traveling wheel 22*a* and a motor 22*b* for rotating the traveling wheel 22*a*. In this specification, the term "traveling wheel" refers to at least one of a front traveling wheel and a rear traveling wheel, and the term "motor" refers to at least one of a front motor that drives the front traveling wheel, and a rear motor that drives the rear traveling wheel.

A hoist module 24 for gripping, raising and lowering the articles may be provided in an interior space of the housing 24*a*. For example, the hoist module 24 is connected to a hoist unit 24*b* for raising and lowering the articles, a slide unit 24*d* for moving the hoist unit 24*b* in a left-right direction, and a hand unit 24*c* which is connected to the hoist unit 24*b* to grip the articles.

Further, a battery is installed inside the housing 24*a*. The conveying robot 20 is supplied with electric power from a power line (40 of FIG. 2), while moving along the rail 50. The supplied power may be used to drive the traveling module 22 or may be stored in the battery. When the conveying robot 20 moves along the rail 50 in which the power line 40 is not installed, the traveling module 22 is operated, using the energy stored in the battery.

Further, an input/output sensor S2 may be installed in the conveying robot 20. The input/output sensor S2 may be installed on a front surface of the housing 24*a* (that is, installed toward a direction of movement). Although the input/output sensor S2 is shown as being installed in the housing 24*a*, the present disclosure is not limited thereto.

The input/output sensor S2 may be, for example, but is not limited to, a PIO (Parallel Input Output) sensor. The PIO sensor installed on the conveying robot 20 may be active, and the PIO sensor installed on the apparatus for storing articles to be described below may be passive. The PIO sensor is a device for performing an E84 communication, and the E84 communication is a communication rule defined by SEMI (Semiconductor Equipment and Materials Internationals).

Figure 4:
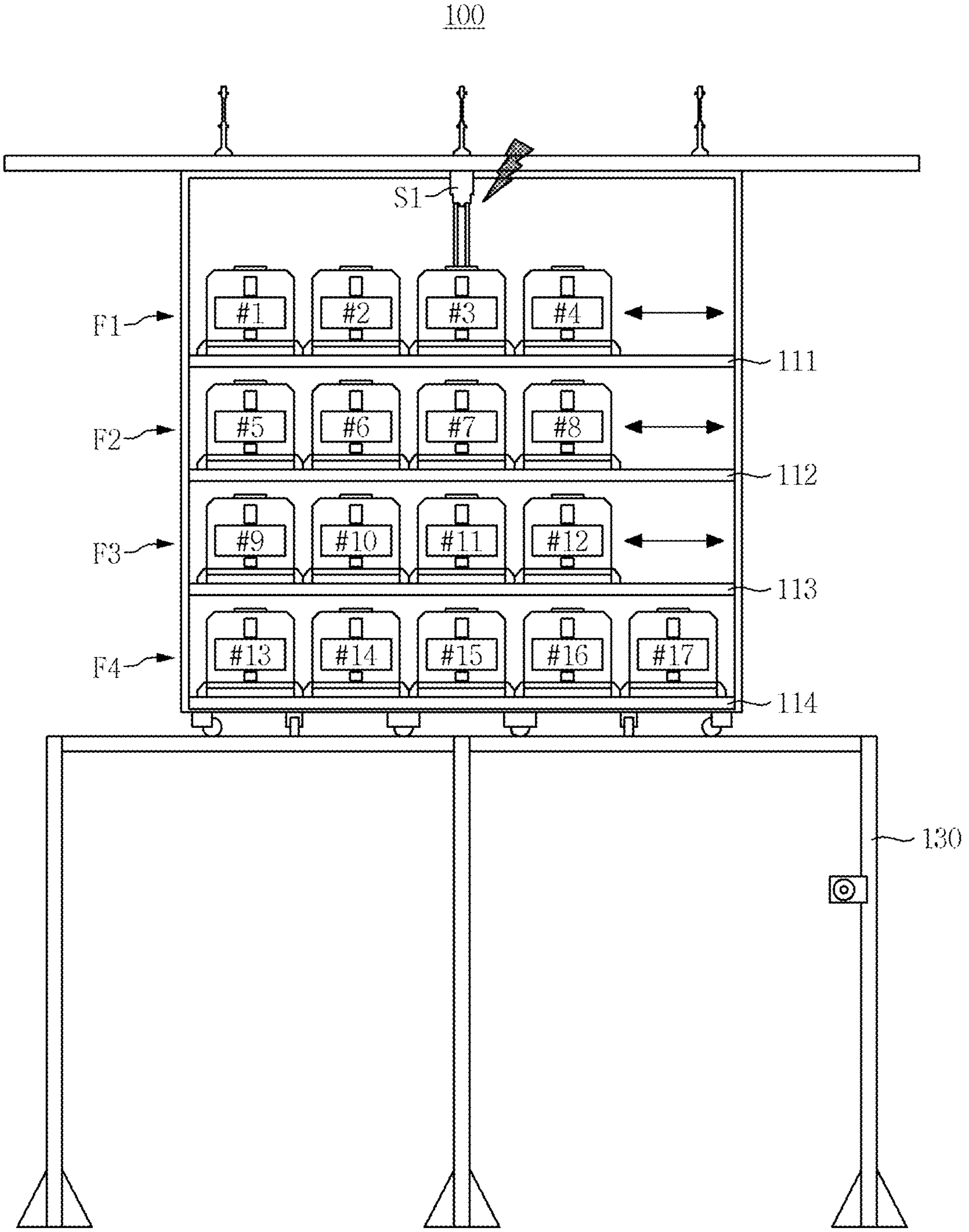
FIG. 4 is a diagram for explaining an apparatus for storing articles according to some embodiments of the present disclosure.

FIG. 4 is a diagram for explaining an apparatus for storing articles according to some embodiments of the present disclosure.

Referring to FIG. 4, the article storing apparatus 100 may include a plurality of ports #1 to #17 for storing the articles, and a support unit 130 for supporting the plurality of ports #1 to #17.

The number of ports #1 to #17 of the article storing apparatus 100 may be, but is not limited to, eight or more.

The plurality of ports #1 to #17 may be disposed on a plurality of layers (F1, F2, F3, and F4). For example, four ports #1 to #4 are disposed on a shelf 111 of an uppermost layer F1, four ports #5 to #8 are disposed on a shelf 112 of a second layer F2, four ports #9 to #12 are disposed on a shelf 113 of a third layer F3, and five ports #13 to #17 may be disposed on the shelf 114 of a lowermost layer F4.

The ports #1 to #12 disposed in the remaining layers F1, F2, and F3 except the lowermost layer F4 may be moved laterally. The ports #13 to #17 disposed on the lowermost layer F4 may not be able to move laterally. For example, when it is necessary to perform an article loading and unloading work (e.g., an article loading and unloading operation) at the port #6 of the second layer F2, the ports #2 to #4 on the uppermost layer F1 may move laterally to expose the top of the port #6.

Meanwhile, the article storing apparatus 100 further includes an input/output sensor S1. The input/output sensor S1 may have one-to-many correspondence with the plurality of ports #1 to #17. For example, one input/output sensor S1 is installed in the article storing apparatus 100, and the input/output sensor S2 of the conveying robot 20 may communicate with the input/output sensor S1 of the article storing apparatus 100 to check the port for performing the operation among the plurality of ports #1 to #17. Such a method will be specifically described below with reference to FIGS. 8 to 14.

The input/output sensor S1 may be, for example, but is not limited to, a PIO (Parallel Input Output) sensor. The PIO sensor installed in the article storing apparatus 100 may be passive.

Figure 5:
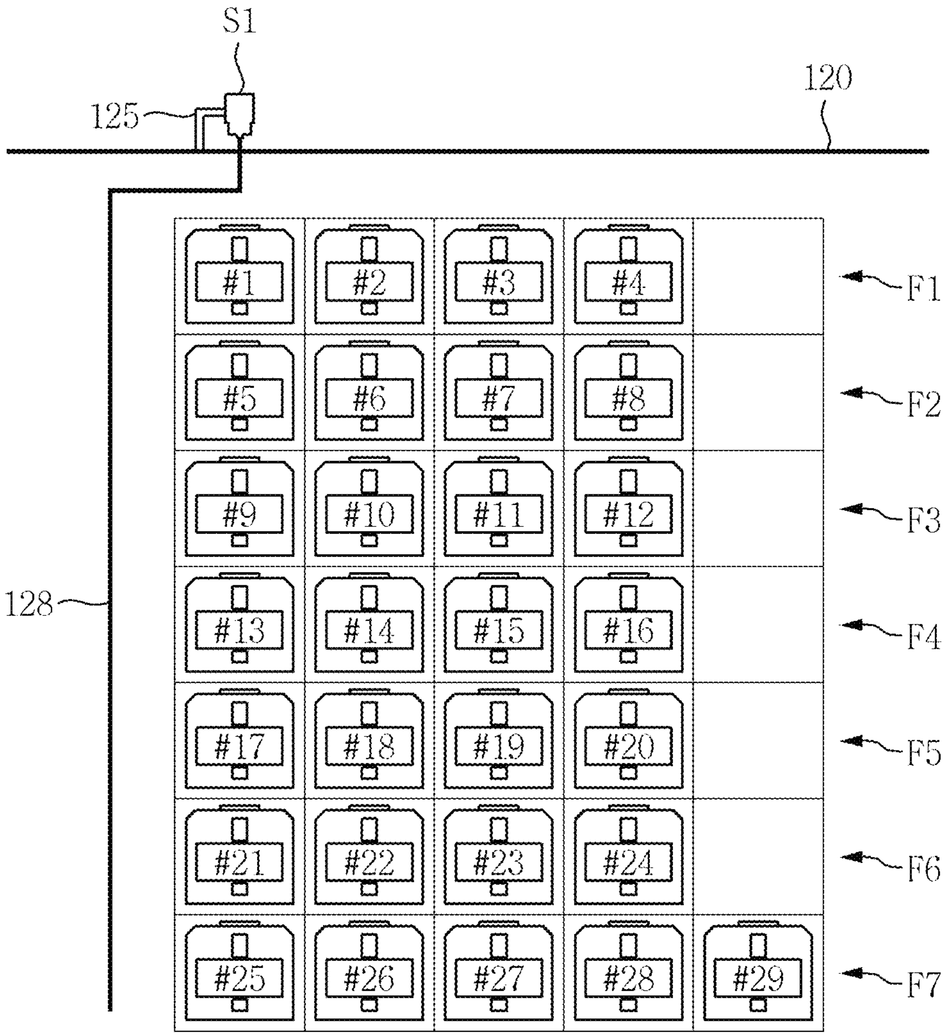
FIG. 5 is a diagram for explaining a structure in which input/output sensors are installed in the apparatus for storing articles according to some embodiments of the present disclosure.

FIG. 5 is a diagram for explaining a structure in which input/output sensors are installed in the apparatus for storing articles according to some embodiments of the present disclosure.

Referring to FIG. 5, the article storing apparatus 100 includes a plurality of ports #1 to #29, a support 120, a holder 125, an electrical wiring 128, an input/output sensor S1, and the like.

The support 120 may be installed substantially parallel to the rail 50 on which the conveying robot 20 travels. The holder 125 is installed on the support 120 and fixes the input/output sensor S1. The input/output sensor S1 is connected to the electrical wiring 128, and may receive power and/or signals through the electrical wiring 128.

A plurality of ports #1 to #29 are disposed under the support 120, and the number thereof may be, for example, but not limited to, 29.

Five ports #25 to #29 are disposed on the lowermost layer F7, and four ports #1 to #24 are disposed on the remaining layers F1 to F6. The four ports #1-#24 disposed on the remaining layers F1 to F6 may be moved laterally.

Figure 6:
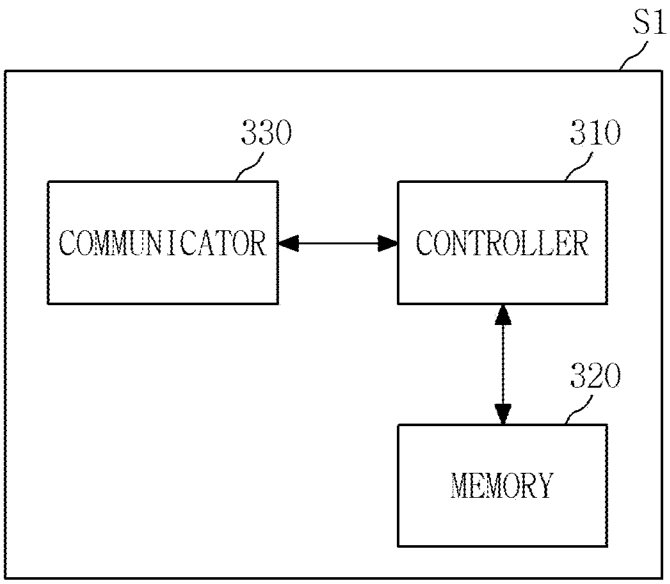
FIG. 6 is a block diagram for explaining the structure of the input/output sensors provided in the apparatus for storing articles according to some embodiments of the present disclosure.

FIG. 6 is a block diagram for explaining the structure of an input/output sensor provided in the apparatus for storing articles according to some embodiments of the present disclosure. FIG. 7 is a diagram for explaining the table stored in the memory of FIG. 6.

Referring to FIG. 6, the input/output sensor S1 includes a controller 310, a memory 320, and a communicator 330. However, the present disclosure is not limited thereto, and the input/output sensor S1 may further include other components, or some components may be omitted. Some components of the input/output sensor S1 may be separated into multiple devices, or multiple components may be merged into one device.

The memory 320 is a computer-readable storage media, and may include a non-perishable mass storage apparatus such as a random access memory (RAM), a read only memory (ROM), and a disk drive. The memory 320 may also temporarily or permanently store program codes for controlling the input/output sensor S1.

Furthermore, the memory 320 may store multiple identifiers of the input/output sensor S1. Additionally, the memory 320 may include a plurality of types of channel information (e.g., channels) corresponding to each of the plurality of identifiers. The memory 320 may store, for example, a table (see FIG. 7) including a plurality of mutually corresponding identifiers and a plurality of types of channel information.

A communicator 330 may provide functionality for communicating with external devices through a network. As an example, a request generated by the controller 310 of the input/output sensor S1 according to a program code stored in the memory 320 may be transferred to an external device through a network under the control of the communicator 330. Conversely, control signals, commands, messages, and the like provided under the control of the processor of the external device may be received by the input/output sensor S1 through the communicator 330 via the network. For example, the control signals, commands, messages, and the like of the external device received through the communicator 330 may be transferred to the controller 310 or the memory 320. The communication scheme is not limited, and may include not only communication schemes that utilize communication networks (as an example, mobile communication network, wired Internet, wireless Internet, and broadcasting network), but also short-range wireless communication directly between the devices. The communicator 330 may be, for example, but is not limited to, a sensor using an RF scheme.

Here, the table including the plurality of identifier IDs and the plurality of types of channel information (Channels) stored in the memory 320 will be described with reference to FIG. 7. When the input/output sensor S1 is a PIO sensor, the plurality of identifiers ID may be PIO identifiers, and the channel information (Channel) may be channel information for performing a PIO communication (e.g., an E84 communication). According to the E84 communication standard, each PIO sensor may have a PIO identifier assigned thereto. The identifier may be, for example, any number from

#000001 to #999999 and may identify the sensor S1 to the conveying robot for the purpose of carrier handoff.

The table includes, for example, twenty-nine identifiers #100001 to #100029, and includes channel information corresponding to each of the identifiers #100001 to #100029. For example, the identifier #100001 corresponds to the channel 214, and the identifier #100002 corresponds to the channel 217. The identifier #100003 corresponds to the channel 178, and as the identifier number increases, the channels may increase by three (i.e., 178, 181, 184 . . . ).

Further, each of the twenty-nine identifiers #100001 to #100029 corresponds to a respective one of the 29 ports (port 1 to port 29).

In the input/output sensors S1 used in the apparatus for storing articles according to some embodiments of the present disclosure, identifiers and/or channel information are changed over time. That is, the identifier of the input/output sensor S1 is not a fixed value but a value that changes over time. Each of the plurality of identifiers corresponds to different ports from each other. Therefore, if the conveying robot attempts to communicate with the input/output sensor S1 of the article storing apparatus 100 using a specific identifier, and then matches the identifier of the input/output sensor S1 which changes over time, the communication (e.g., E84 communication) between the conveying robot and the input/output sensor (S1) starts. Once the communication starts, the article loading and unloading work of the conveying robot is performed at the port corresponding to the specific identifier. Therefore, even if one input/output sensor S1 is used, the article loading and unloading work may be performed smoothly at a plurality of ports. This operation will be specifically explained using FIGS. 8 and 9.

Figure 8:
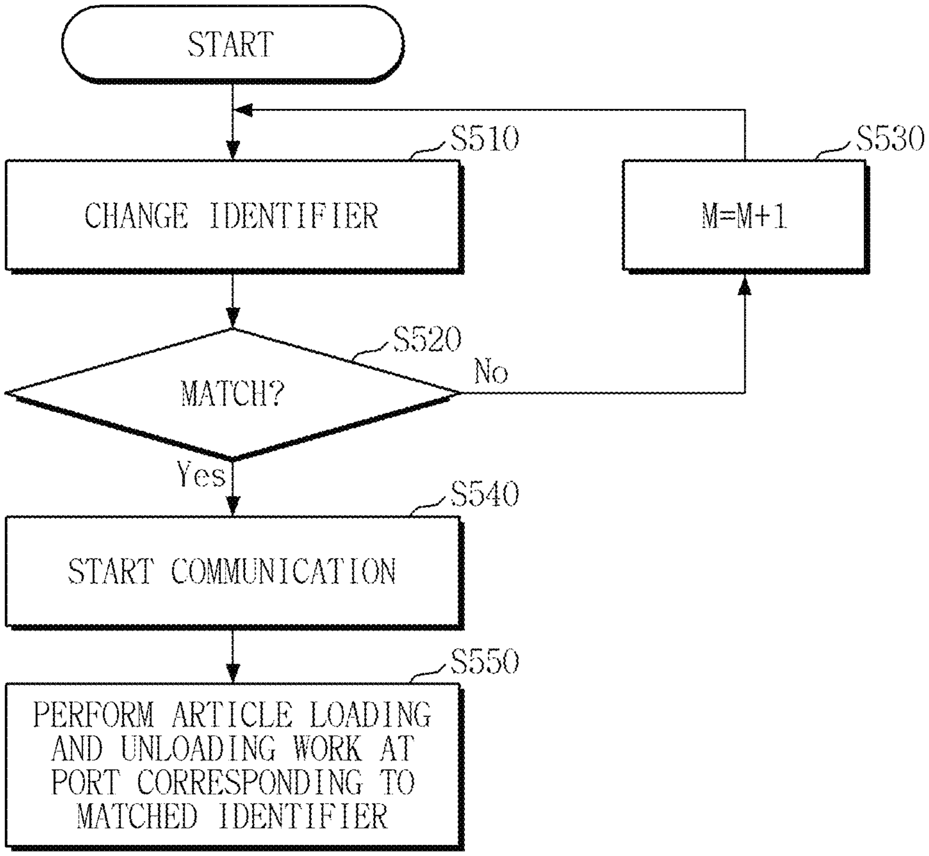
FIG. 8 is a flowchart for explaining a method for storing articles according to some embodiments of the present disclosure.
Figure 9:
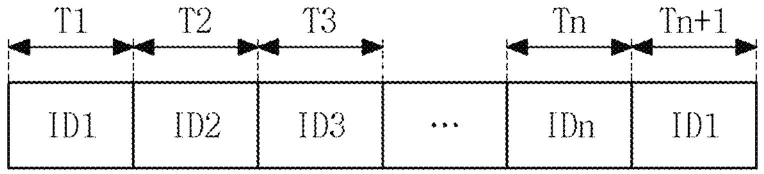
FIG. 9 is a conceptual diagram for explaining an identifier that changes over time.

FIG. 8 is a flowchart for explaining a method for storing articles according to some embodiments of the present disclosure. FIG. 9 is a conceptual diagram for explaining an identifier that changes over time.

Referring to FIGS. 7, 8, and 9, the controller 310 of the input/output sensor S1 may change the identifier of the input/output sensor S1 to be a first identifier ID1 during a first time interval T1 (S510). The first identifier ID1 may be, for example, an identifier (#100001) in FIG. 7.

Next, during the first time interval T1, the conveying robot may provide an identifier (or a confirmation message including the identifier). The controller (see 310 of FIG. 6) checks whether the first identifier ID1 matches the identifier provided by the conveying robot (S520).

Subsequently, if the first identifier ID1 does not match the identifier provided by the conveying robot, or if there is no access of the conveying robot during the first time interval T1 (No of S520), the identifier number m is increased (i.e., m=m+1) (S530).

Again, during the second time interval T2, the controller 310 changes the identifier of the input/output sensor S1 to be the second identifier ID2 (S510). The second identifier ID2 may be, for example, the identifier #100002 in FIG. 7.

Next, during the second time interval T2, the conveying robot may provide an identifier (or a confirmation message including the identifier). The controller (see 310 of FIG. 6) checks whether the second identifier ID2 matches the identifier provided by the conveying robot (S520).

Subsequently, when the second identifier ID2 matches the identifier provided by the conveying robot (Yes of S520), communication between the input/output sensor S1 and the conveying robot (i.e., see the input/output sensor S2 of the conveying robot) starts (S540).

The disclosed communication may be an E84 communication. Various signals (e.g., VALID, TR_REQ, L_REQ, COMPT, CONT, HO_AVBL, ES, CS, etc.) may be sent and received for loading and unloading the articles. A VALID signal is a signal indicating that a signal transition is active, a TR_REQ signal is a signal that an active I/O sensor requests transfer to a passive I/O sensor, and an L_REQ signal is a signal that a passive I/O sensor requests load to an active I/O sensor. A COMPT signal is a signal indicating that the transfer is completed, and a CONT signal is a signal indicating that handoff is in progress. A HO_AVBL signal is a signal indicating that handoff is available. An ES signal is a signal indicating an emergency stop.

The CS signal was traditionally used to differentiate between ports using two or more bits. For example, three ($=2^2-1$) ports were distinguished from each other according to the on/off of a 2-bit CS signal (i.e., CS0, and CS1 signal). Alternatively, seven ($=2^3-1$) ports were distinguished from each other according to the on/off of a 3-bit CS signal (i.e., CS0, CS1, and CS2 signals).

However, according to some embodiments of the present disclosure, the CS signal uses only an on/off operation of a 1-bit CS signal (i.e., CS0) for operations required on the sequence of the E84 communication. According to some embodiments, the 1-bit CS signal CS0 may not be used to distinguish the ports.

When using the CS signals to distinguish the ports, the number of ports that may be distinguished is limited depending on the number of usable CS signals (bits). Since the number of CS signals usable in the PIO sensor is three (CS0, CS1, and CS2), only seven ports may be distinguished from each other. That is, in order to distinguish eight or more ports, more input/output sensors S1 (PIO sensors) are required.

On the other hand, according to some embodiments of the present disclosure, since the multiple identifiers are sequentially allocated to PIO sensors, eight or more ports may be distinguished, even when using only one PIO sensor. Therefore, there is no need for additional mechanisms and electrical components associated with the PIO sensor. The footprint of the apparatus for storing articles is not increased and installation costs are not increased.

Next, the conveying robot executes the article loading and unloading work at the port corresponding to the matched identifier (S550). For example, since the second identifier ID2 (e.g., #100002) corresponds to No. 2 port (see FIG. 7), the conveying robot performs the article loading and unloading work at No. 2 port. That is, the conveying robot unloads the article at the second port or picks up the article located at the second port.

On the other hand, unlike the above, if there is no match with the second identifier ID2, the identifier of the input/output sensor S1 may be changed (S530) until matching is performed. That is, all the identifiers in the table stored in the memory 320 may be allocated to the input/output sensors S1 sequentially (or in a preset order). That is, if the second identifier ID2 does not match the identifier provided by the conveying robot, or if there is no access by the conveying robot during the second time interval T2, the third identifier ID3 (e.g., #100003) is allocated to the input/output sensor S1 during a third time interval T3.

Such operations are repeated to allocate an n-th identifier IDn (e.g., #100029) to the input/output sensor S1 during an n-th time interval Tn.

If the n-th identifier IDn does not match the identifier provided by the conveying robot, or if there is no access of the conveying robot during the n-th time interval (Tn), the first identifier ID1 (e.g., #100001) is allocated to the input/output sensor S1 for an n+1-th time interval (Tn+1)). Furthermore, the second identifier ID2, the third identifier ID3, and the like are sequentially allocated in accordance with the flow of time.

In this way, the operation of sequentially allocating a plurality of identifiers stored in the table to the input/output sensor S1 in accordance with the flow of time is named a "scan operation."

When a matching identifier is identified through the scanning operation, the article loading and unloading work proceeds at the port corresponding to the matched identifier. For example, if the identifier (e.g., #100004) corresponding to the No. 4 port matches the identifier provided by the conveying robot, the conveying robot performs the article loading and unloading work at the No. 4 port. If the identifier (for example #100025) corresponding to No. 25 port matches the identifier provided by the conveying robot, the conveying robot performs the article loading and unloading work at No. 25 port.

On the other hand, not only the plurality of identifiers stored in the input/output sensor S1 may be sequentially changed, but also the channel information corresponding to the plurality of identifiers may be changed together with the plurality of identifiers.

In such a case, communication with the conveying robot starts, using the identifier and channel information. For example, in a matching check step S520, the conveying robot provides a confirmation message including an identifier and channel information to the input/output sensor S1. The controller (see 310 of FIG. 6) checks whether the changed identifier and channel information of the input/output sensor S1 match the identifier and channel information provided by the conveying robot. When both the identifier and channel information match, communication with the conveying robot starts. If either the identifier or the channel information does not match, communication with the conveying robot does not start.

The first identifier ID1 (e.g., #100001) and the channel information (e.g., 214, see FIG. 7) must match for the first time interval T1, such that communication is performed through the channel of the channel information, and the article loading and unloading work is performed at No. port 1 corresponding to the identifier ID1.

The second identifier ID2 (e.g., #100002) and the channel information (e.g., 217) must match for the second time interval T2, such that communication is performed through the channel of the channel information, and the article loading and unloading work is performed at No. 2 port corresponding to the identifier ID2.

Similarly, the n-th identifier IDn (e.g., #100029) and the channel information (e.g., 205) must match for the n-th time interval Tn, such that communication is performed through the channel of the channel information, and the article loading and unloading work is performed at No. 29 port corresponding to the n-th identifier IDn.

Figure 10:
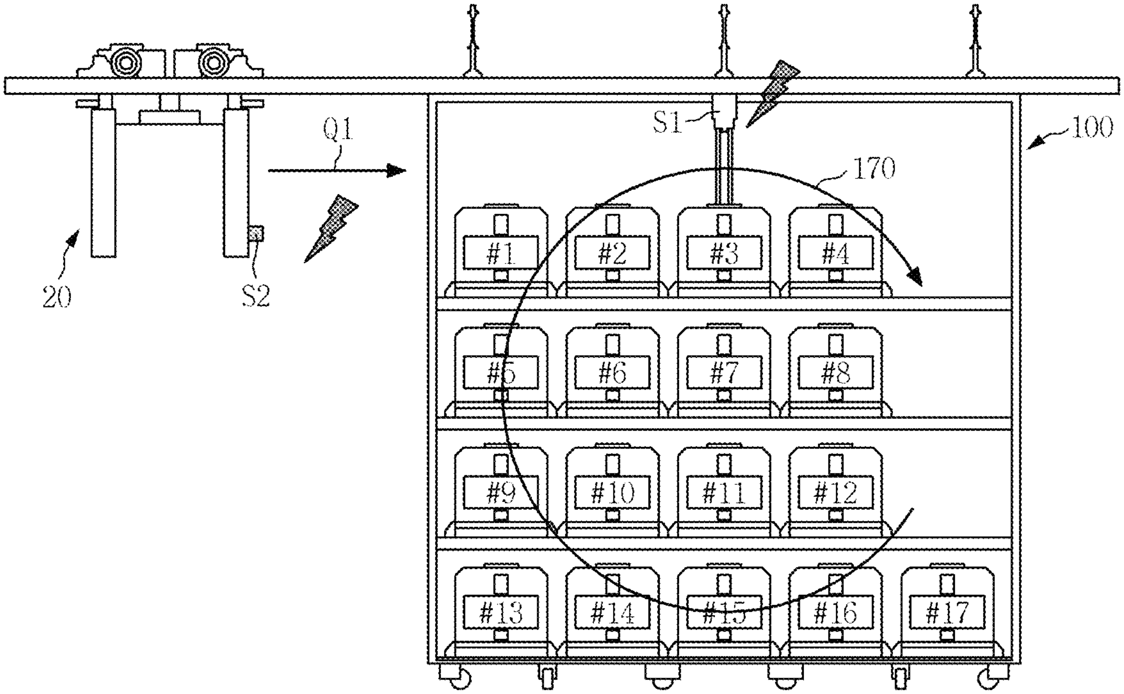
FIGS. 10 to 12 are intermediate stage diagrams for explaining the method for storing articles according to some embodiments of the present disclosure.
Figure 11:
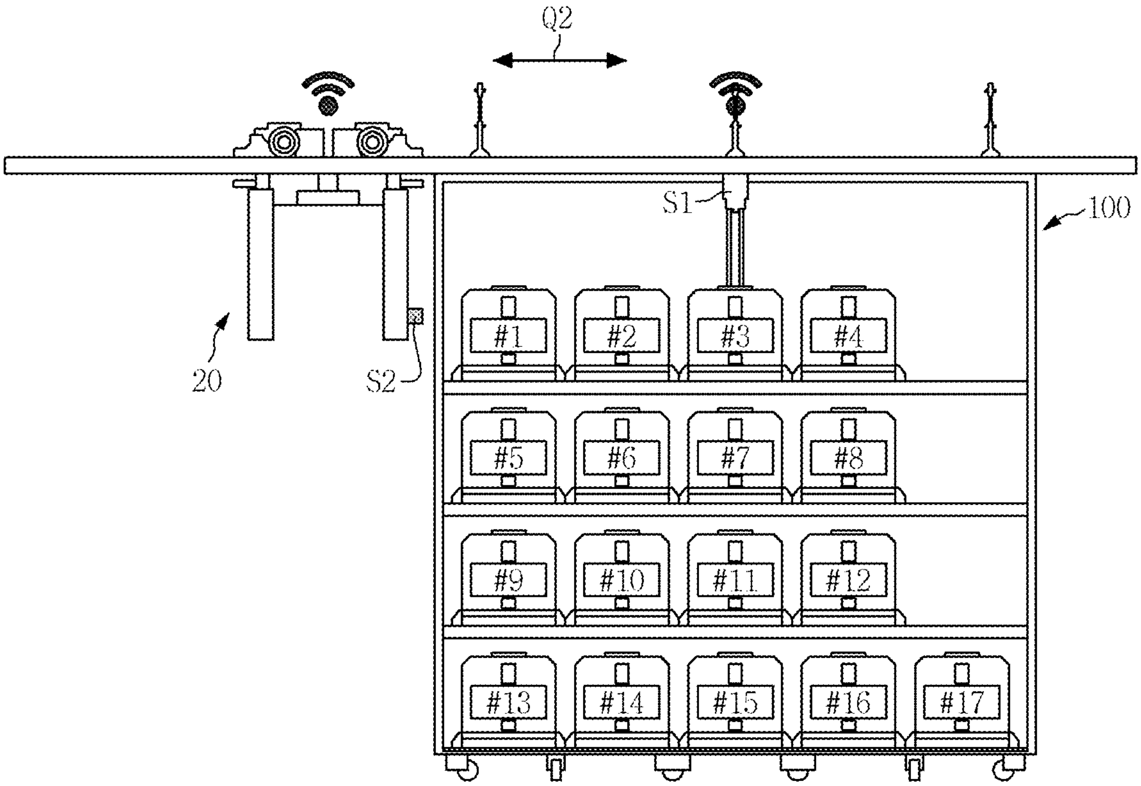
Figure 12:
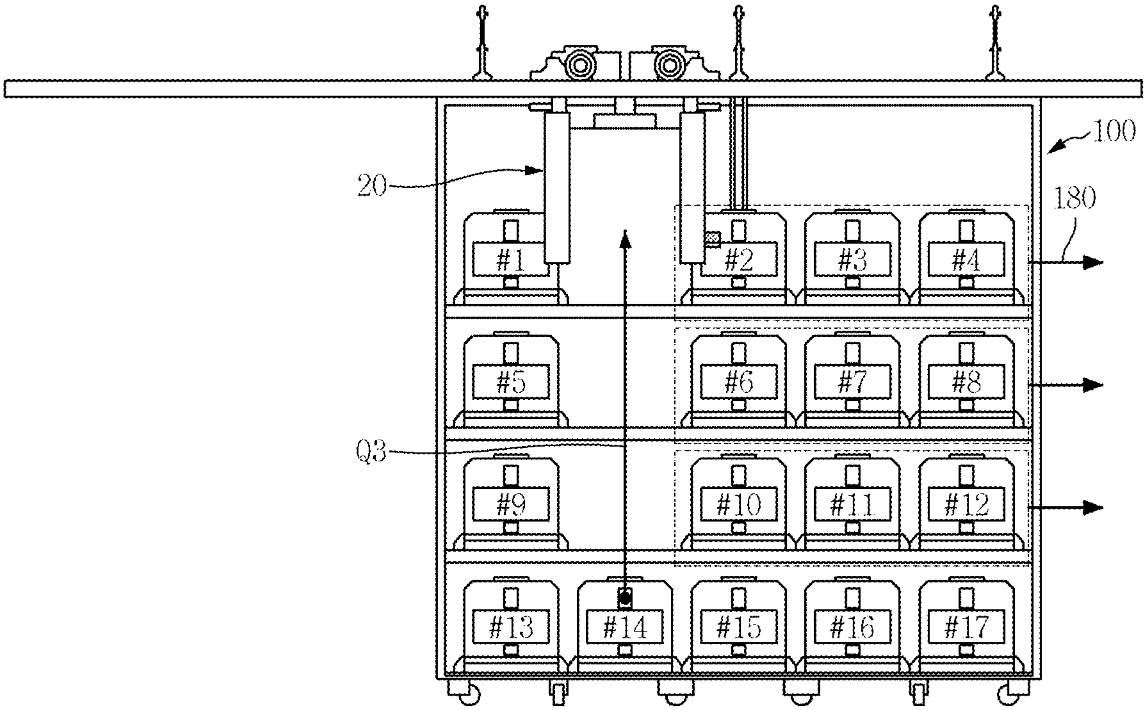

FIGS. 10 to 12 are intermediate stage diagrams for explaining the method for storing articles according to some embodiments of the present disclosure.

Referring to FIG. 10, the conveying robot 20 receives a work instruction from the overhead controller OCS, and moves to the article storing apparatus 100 in accordance with the work instruction (see reference numeral Q1). The work instruction may include an identifier (i.e., ID) of the input/output sensor (e.g., PIO sensor), and channel information for performing PIO communication (e.g., E84 communication) with the PIO sensor. Identifier/channel information is set in the conveying robot 20.

The conveying robot 20 is provided with the input/output sensor S2, and the article storing apparatus 100 is also provided with the input/output sensor S1.

Although the article storing apparatus 100 has been shown to include seventeen ports #1 to #17, the present disclosure is not limited thereto. The identifier/channel information of the input/output sensor S1 of the article storing apparatus 100 is sequentially changed by the controller of the input/output sensor S1 as time passes. That is, the scan operation 170 proceeds.

Referring to FIG. 11, when the identifier/channel information changed in the article storing apparatus 100 matches the identifier/channel information set in the conveying robot 20, the communication between the conveying robot 20 and the article storing apparatus 100 starts (see reference number Q2).

Referring to FIG. 12, a controller 310 of the article storing apparatus 100 identifies the port corresponding to the matched identifier. For example, if the matched identifier is #100014, the port corresponding to #100014 may be a fourteenth port #14.

In order to expose the top of the fourteenth port, the uppermost layer ports #2 to #4, the second layer ports #6 to #8, and the third layer ports #10 to #12 are moved laterally (see reference numeral 180).

Next, the conveying robot 20 picks up the article at the fourteenth port (#14) (see reference number Q3).

Figure 13:
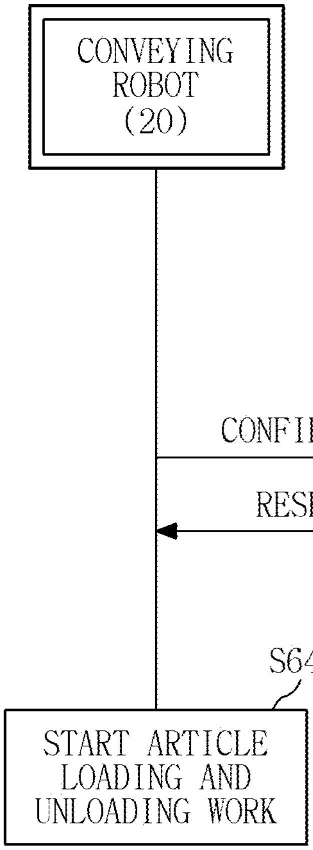
FIG. 13 is a flowchart for explaining an identifier matching operation between the conveying robot and the apparatus for storing articles.

FIG. 13 is a flowchart for explaining the identifier matching operation between the conveying robot and the apparatus for storing articles.

Referring to FIG. 13, in the article storing apparatus 100, the controller 310 allocates the identifier to the input/output sensor S1 (S610). For example, the controller 310 changes the identifier of the input/output sensor S1 to the first identifier ID1 at the first time interval T1.

Subsequently, the conveying robot 20 may provide an identifier (or a confirmation message including the identifier) during the first time interval T1 (S620).

Next, the controller 310 of the article storing apparatus 100 checks whether the identifier provided by the conveying robot 20 matches the changed first identifier ID1. Next, the controller 310 of the article storing apparatus 100 transmits a response message indicating the match to the conveying robot 20 (S630).

As a result, communication between the input/output sensor S2 of the conveying robot 20 and the input/output sensor S1 of the article storing apparatus 100 starts.

Then, the conveying robot 20 performs the article loading and unloading work at the port corresponding to the matched identifier (S640).

Figure 14:
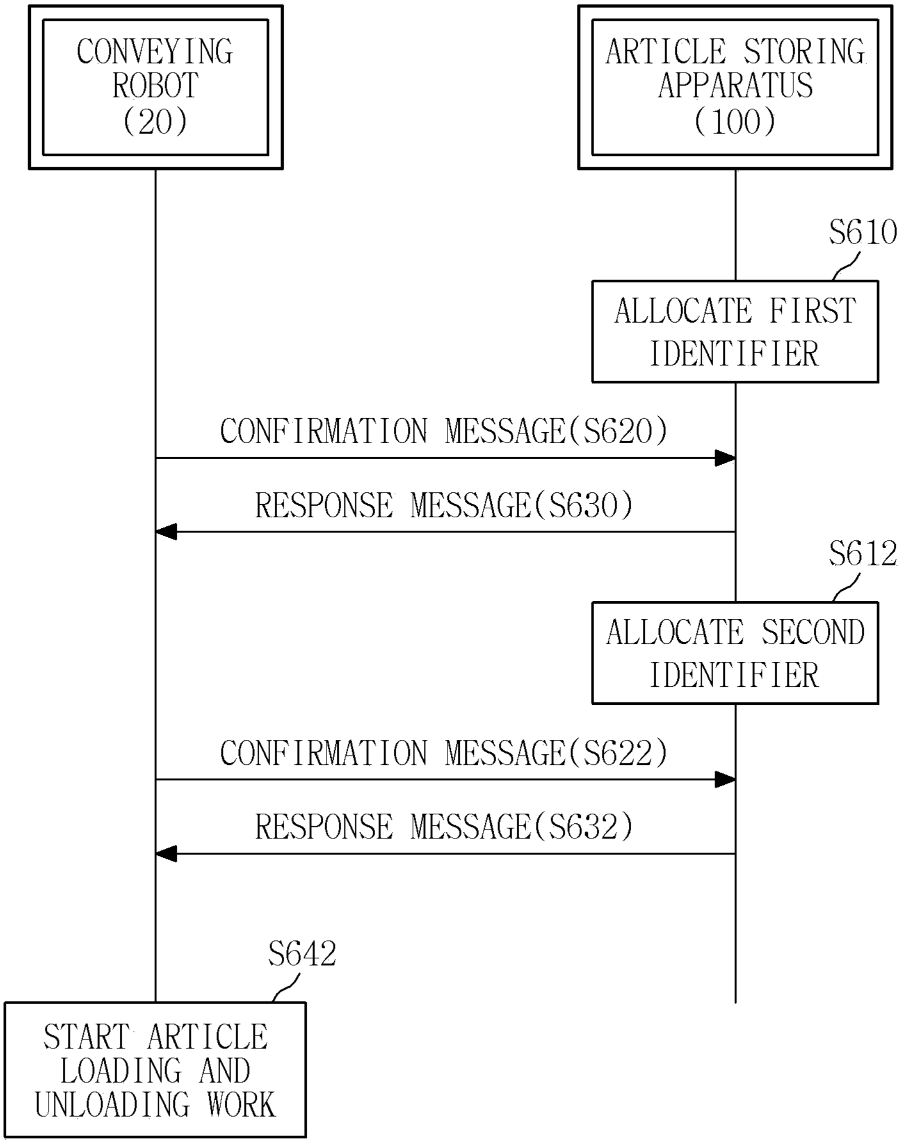
FIG. 14 is a flowchart for explaining the identifier matching operation between the conveying robot and the apparatus for storing articles.

FIG. 14 is a flowchart for explaining the identifier matching operation between the conveying robot and the apparatus for storing articles.

Referring to FIG. 14, in the article storing apparatus 100, the controller 310 allocates a first identifier to the input/output sensor S1 (S610). For example, the controller 310 changes the identifier of the input/output sensor S1 to the first identifier ID1 at the first time interval T1.

Subsequently, the conveying robot 20 may provide an identifier (or a confirmation message including the identifier) during the first time interval T1 (S620).

Next, the controller 310 of the article storing apparatus 100 checks whether the identifier provided by the conveying robot 20 matches the changed first identifier ID1. Next, the controller 310 of the article storing apparatus 100 transmits a response message indicating a non-match to the conveying robot 20 (S630).

Next, in the article storing apparatus 100, the controller 310 allocates a second identifier to the input/output sensor S1 (S612). For example, the controller 310 changes the identifier of the input/output sensor S1 to the second identifier ID2 at the second time interval T2.

Then, the conveying robot 20 may provide the identifier (or a confirmation message including the identifier) again during the second time interval T2 (S622).

Next, the controller 310 of the article storing apparatus 100 checks whether the identifier provided by the conveying robot 20 matches the changed second identifier ID2. Next, the controller 310 of the article storing apparatus 100 transmits a response message indicating a match to the conveying robot 20 (S632).

As a result, communication between the input/output sensor S2 of the conveying robot 20 and the input/output sensor S1 of the article storing apparatus 100 starts.

Then, the conveying robot 20 performs the article loading and unloading work at the port corresponding to the matched identifier (S642).

Although the embodiments of the present disclosure have been described above with reference to the accompanying drawings, the present disclosure is not limited to the above embodiments, and may be fabricated in various different forms. Those skilled in the art will appreciate that the present disclosure may be embodied in other specific forms without changing the technical spirit or essential features of the present disclosure. Accordingly, the above-described embodiments should be understood in all respects as illustrative and not restrictive.

What is claimed is:

1. An apparatus for storing articles comprising:

first and second ports different from each other; and one input/output sensor corresponding to the first port and the second port, wherein the input/output sensor includes:

a memory configured to store first and second identifiers different from each other, and a controller configured to allocate the first identifier to the input/output sensor during a first time interval, and allocate the second identifier to the input/output sensor during a second time interval, wherein the first port corresponds to the first identifier, and the second port corresponds to the second identifier, the controller is configured such that, when the controller starts a communication with a conveying robot using the first identifier during the first time interval, the conveying robot performs an article loading and unloading operation at the first port, and the controller is configured such that, when the controller starts the communication with the conveying robot using the second identifier during the second time interval, the conveying robot performs the article loading and unloading operation at the second port.

2. The apparatus for storing articles of claim 1, wherein the memory further stores first channel information which is a channel used to communicate with the input/output sensor when the first identifier is allocated to the input/output sensor, and stores second channel information which is a channel used to communicate with the input/output sensor when the second identifier is allocated to the input/output sensor.

3. The apparatus for storing articles of claim 2, wherein the controller is configured to start the communication with the conveying robot using the first identifier and the first channel information during the first time interval, and wherein the controller is configured to start the communication with the conveying robot using the second identifier and the second channel information during the second time interval.

4. The apparatus for storing articles of claim 2, wherein the conveying robot is configured to receive a work instruction from an overhead controller, and the work instruction includes an identifier and channel information of an input/output sensor provided in the apparatus for storing articles.

5. The apparatus for storing articles of claim 1, wherein the controller is configured to:

receive a confirmation message using the first identifier from the conveying robot during the first time interval, and then transmit a first response message to the conveying robot.

6. The apparatus for storing articles of claim 1, wherein the controller is configured to: receive a first confirmation message using the first identifier from the conveying robot transmitted during the first time interval, transmit a first response message indicating a non-match to the conveying robot in response to the first confirmation message, then receive a second confirmation message using the second identifier from the conveying robot during the second time interval; and then transmit a second response message indicating a match to the conveying robot in response to the second confirmation message.

7. The apparatus for storing articles of claim 1, further comprising:

a third port different from the first port and the second port, wherein the memory further includes a third identifier different from the first identifier and the second identifier, the controller is configured to allocate the third identifier to the input/output sensor for a third time interval, the third port corresponds to the third identifier, and the controller is configured such that, when the controller starts the communication with the conveying robot using the third identifier during the third time interval, the conveying robot performs the article loading and unloading operation at the third port.

8. The apparatus for storing articles of claim 7, wherein the controller is configured to repeat sequential allocation of the first identifier, the second identifier, and the third identifier to the input/output sensor, until the communication with the conveying robot starts.

9. The apparatus for storing articles of claim 1, wherein the communication with the conveying robot is an E84 communication, and only one bit of a CS signal is used in the E84 communication.

10. The apparatus for storing articles of claim 1, wherein the input/output sensor is a parallel input output (PIO) sensor that utilizes a radio frequency (RF) scheme.

11. The apparatus for storing articles of claim 1, wherein the first port is on a first layer of the apparatus for storing articles, and the second port is located on a second layer of the apparatus for storing articles below the first layer, and the first port is configured to be movable in a lateral direction so that the conveying robot performs the article loading and unloading operation at the second port.

12. An apparatus for storing articles comprising:

a plurality of ports; and one parallel input output (PIO) sensor that corresponds to the plurality of ports, wherein the PIO sensor includes:

a memory configured to store a table including a plurality of PIO identifiers and a plurality of types of PIO channel information respectively corresponding to each of the plurality of PIO identifiers, and a controller connected to the memory, wherein the plurality of PIO identifiers have a one-to-one correspondence with the plurality of ports, the controller is configured to change the PIO identifier and the PIO channel information of the PIO sensor based on the table at each of a plurality of preset periods, when the changed PIO identifier and the changed PIO channel information match a PIO identifier and PIO channel information of a conveying robot, the controller is configured to start communication with the conveying robot, and the conveying robot is configured to perform an article loading and unloading operation at a port corresponding to the matched PIO identifier.

13. The apparatus for storing articles of claim 12, wherein the controller is configured to change the PIO identifier and the PIO channel information of the PIO sensor in a preset order based on the table.

14. The apparatus for storing articles of claim 12, wherein the communication with the conveying robot is an E84 communication, and only 1 bit of a CS signal is used in the E84 communication.

15. The apparatus for storing articles of claim 12, wherein the plurality of ports are divided into a plurality of layers, and a port belonging to any one of the plurality of layers is configured to be movable in a lateral direction.

16. The apparatus for storing articles of claim 12, wherein the number of the plurality of ports is eight or more.

17. A method for storing articles comprising:

providing an apparatus for storing articles which includes a plurality of ports, and one PIO sensor that corresponds to the plurality of ports, in which the PIO sensor includes a memory that stores a table including a plurality of PIO identifiers having a one-to-one correspondence with the plurality of ports, and a controller connected to the memory, changing a PIO identifier assigned to the PIO sensor based on the table stored in the memory at each of a plurality of preset periods;

starting a communication with a conveying robot, when the changed PIO identifier associated with the PIO sensor matches a PIO identifier of the conveying robot; and performing an article loading and unloading operation using the conveying robot at a port corresponding to the matched PIO identifier, the port being from among the plurality of ports.

18. The method for storing articles of claim 17, wherein the table further includes a plurality of types of PIO channel information respectively corresponding to each of the plurality of PIO identifiers, the changing the PIO identifier associated with the PIO sensor includes changing the PIO identifier and the PIO channel information associated with the PIO sensor according to a preset order based on the table, and the matching of the changed PIO identifier associated with the PIO sensor with the PIO identifier of the conveying robot includes matching of the changed PIO identifier and PIO channel information associated with the PIO sensor with the PIO identifier and PIO channel information of the conveying robot.

19. The method for storing articles of claim 17, wherein the communication with the conveying robot is an E84 communication, and only 1 bit of a CS signal is used in the E84 communication.

20. The method for storing articles of claim 17, wherein the plurality of ports are divided into a plurality of layers, and a port belonging to any one of the plurality of layers is configured to be movable in a lateral direction.

* * * * *